(12) United States Patent
Li et al.

(10) Patent No.: US 12,272,788 B2
(45) Date of Patent: Apr. 8, 2025

(54) IN-SITU GELATION METHOD TO MAKE A BIPOLAR SOLID-STATE BATTERY

(71) Applicant: GM Global Technology Operations LLC, Detroit, MI (US)

(72) Inventors: Zhe Li, Shanghai (CN); Meiyuan Wu, Shanghai (CN); Yong Lu, Shanghai (CN); Haijing Liu, Shanghai (CN); Xiaochao Que, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 558 days.

(21) Appl. No.: 17/542,299

(22) Filed: Dec. 3, 2021

(65) Prior Publication Data
US 2022/0181685 A1 Jun. 9, 2022

(30) Foreign Application Priority Data
Dec. 4, 2020 (CN) .......................... 202011398205.1

(51) Int. Cl.
*H01M 10/0565* (2010.01)
*H01M 10/0585* (2010.01)
*H01M 4/02* (2006.01)

(52) U.S. Cl.
CPC ... *H01M 10/0565* (2013.01); *H01M 10/0585* (2013.01); *H01M 2004/029* (2013.01);
(Continued)

(58) Field of Classification Search
CPC ........ H01M 10/0565; H01M 10/0562; H01M 2004/029; H01M 10/0418; H01M 2220/20; H01M 10/044; Y10T 29/49114
(Continued)

(56) References Cited

U.S. PATENT DOCUMENTS 8,753,770 B2 * 6/2014 Kawamoto ....... H01M 10/0431
429/94
10,714,756 B2 * 7/2020 Dai ...................... H01M 4/667
(Continued)

FOREIGN PATENT DOCUMENTS

CN 114597484 A 6/2022
DE 102021114601 A1 6/2022
(Continued)

OTHER PUBLICATIONS

First Office Action for Chinese Patent Application No. 202011398205.1 issued on Nov. 14, 2023, with correspondence from China Patent Agent (H.K.) Ltd. summarizing Office Action; 9 pages.
(Continued)

*Primary Examiner* — Thiem D Phan
(74) *Attorney, Agent, or Firm* — Harness, Dickey & Pierce, P.L.C.

(57) ABSTRACT

A method for forming a bipolar solid-state battery includes preparing a mixture of gel precursor solution and solid electrolyte. The gel precursor includes a polymer, a first solvent, and a liquid electrolyte. The liquid electrolyte includes a second solvent, a lithium salt, and electrolyte additive. The method includes loading the mixture onto at least one of a first electrode, a second electrode, and a third electrode. Each of the first, second, and third electrodes includes a plurality of solid-state electroactive particles. The method includes removing at least a portion of the first solvent from the mixture to form a gel and positioning one of the first, second, and third electrodes with respect to another of the first, second, and third electrodes. The method includes applying a polymer blocker to a border of the first, second, or third electrodes.

19 Claims, 7 Drawing Sheets

(52) U.S. Cl.
CPC .............. *H01M 2300/0082* (2013.01); *H01M 2300/0085* (2013.01); *Y10T 29/49114* (2015.01)

(58) Field of Classification Search
USPC .......................... 29/623.4, 623.1, 623.5, 730
See application file for complete search history.

(56) References Cited

U.S. PATENT DOCUMENTS

| | | |
|---|---|---|
| 11,121,375 B2 | 9/2021 | Hou et al. |
| 11,145,922 B2 | 10/2021 | Li et al. |
| 11,205,798 B2 | 12/2021 | Li et al. |
| 11,217,826 B2 | 1/2022 | Li et al. |
| 11,374,257 B2 | 6/2022 | Hou et al. |
| 11,539,071 B2 | 12/2022 | Li et al. |
| 11,575,120 B2 | 2/2023 | Hou et al. |
| 2013/0230778 A1 | 9/2013 | Saimen et al. |
| 2015/0050537 A1 | 2/2015 | Christensen et al. |
| 2017/0358824 A1 | 12/2017 | Harada et al. |
| 2017/0358825 A1 | 12/2017 | Yoshima et al. |
| 2018/0277909 A1 | 9/2018 | Harada et al. |
| 2019/0214685 A1 | 7/2019 | Chang et al. |
| 2019/0260075 A1 | 8/2019 | Yoshima et al. |
| 2020/0403267 A1 | 12/2020 | Li et al. |
| 2021/0020929 A1 | 1/2021 | Kong et al. |
| 2021/0028481 A1 | 1/2021 | Hou et al. |
| 2021/0050157 A1 | 2/2021 | Hou et al. |
| 2021/0050596 A1 | 2/2021 | Li et al. |
| 2021/0057776 A1 | 2/2021 | Lu et al. |
| 2021/0111426 A1 | 4/2021 | Li et al. |
| 2021/0135224 A1 | 5/2021 | Hou et al. |
| 2022/0123352 A1 | 4/2022 | Li et al. |
| 2022/0140422 A1 | 5/2022 | Chen et al. |
| 2022/0166031 A1 | 5/2022 | Li et al. |
| 2022/0181598 A1 | 6/2022 | Lu et al. |

FOREIGN PATENT DOCUMENTS

| | | |
|---|---|---|
| JP | 2005129456 A | 5/2005 |
| JP | 2013054826 A | 3/2013 |
| JP | 2019212632 A | 12/2019 |
| WO | WO-2020182241 A1 | 9/2020 |

OTHER PUBLICATIONS

Second Office Action for Chinese Patent Application No. 202011398205.1 issued on Apr. 12, 2024, with correspondence from China Patent Agent (H.K.) Ltd. summarizing Office Action; 8 pages.

Third Office Action for Chinese Patent Application No. 202011398205.1 issued on Jul. 5, 2024, with correspondence from China Patent Agent (H.K.) Ltd. summarizing Office Action; 9 pages.

\* cited by examiner

IN-SITU GELATION METHOD TO MAKE A BIPOLAR SOLID-STATE BATTERY

CROSS-REFERENCE TO RELATED APPLICATIONS

This application claims the benefit and priority of Chinese Application No. 202011398205.1, filed Dec. 4, 2020. The entire disclosure of the above application is incorporated herein by reference.

INTRODUCTION

This section provides background information related to the present disclosure which is not necessarily prior art.

Electrochemical energy storage devices, such as lithium-ion batteries, can be used in a variety of products, including automotive products, such as start-stop systems (e.g., 12V start-stop systems), battery-assisted systems ("p BAS"), Hybrid Electric Vehicles ("HEVs"), and Electric Vehicles ("EVs"). Typical lithium-ion batteries include two electrodes, a separator, and an electrolyte. Lithium-ion batteries may also include various terminal and packaging materials. One of the two electrodes serves as a positive electrode or cathode, and the other electrode serves as a negative electrode or anode. Many rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes.

The electrolyte is suitable for conducting lithium ions (or sodium ions in the case of sodium-ion batteries) between the electrodes and, like the two electrodes, may be in a solid form, a liquid form, or a solid-liquid hybrid form. In the instances of solid-state batteries, which include a solid-state electrolyte layer disposed between solid-state electrodes, the solid-state electrolyte layer physically separates the electrodes so that a distinct separator is not required.

Solid-state batteries have advantages over batteries that include a separator and a liquid electrolyte. These advantages can include a longer shelf life with lower self-discharge, simpler thermal management, a reduced need for packaging, and the ability to operate within a wider temperature window. For example, solid-state electrolytes are generally non-volatile and non-flammable, so as to allow cells to be cycled under harsher conditions without experiencing diminished potential or thermal runaway, which can potentially occur with the use of liquid electrolytes. However, solid-state batteries generally experience comparatively low power capabilities. For example, such low power capabilities may be a result of interfacial resistance within the solid-state electrodes and/or at the electrode, and solid-state electrolyte layer interfacial resistance caused by limited contact, or void spaces, between the solid-state active particles and/or the solid-state electrolyte particles. Accordingly, it would be desirable to develop high-performance solid-state battery materials and methods that improve the contact and/or interaction between the solid-state active particles and/or the solid-state electrolyte particles, the contact and/or interaction between the solid-state electrodes and solid-state electrolyte layer, and/or mitigates the effects of the void spaces within the solid-state battery.

SUMMARY

This section provides a general summary of the disclosure, and is not a comprehensive disclosure of its full scope or all of its features.

The present disclosure relates to solid-state batteries, for example bipolar solid-state batteries, and to an in-situ gelation method to make a bipolar solid-state battery.

For example, in one aspect a method for forming a bipolar solid-state battery includes preparing a mixture of gel precursor solution and solid electrolyte, wherein the gel precursor includes a polymer, a first solvent, and a liquid electrolyte, wherein the liquid electrolyte includes a second solvent, a lithium salt, and an electrolyte additive. The method also includes loading the mixture of the gel precursor solution and the solid electrolyte onto at least one of a first electrode, a second electrode, and a third electrode, wherein each of the first electrode, the second electrode, and the third electrode includes a plurality of solid-state electroactive particles. The method also includes removing at least a portion of the first solvent from the mixture of gel precursor and solid electrolyte to form a gel. The method also includes positioning one of the first electrode, the second electrode, and the third electrode with respect to another of the first electrode, the second electrode, and the third electrode.

In one aspect, the polymer includes a poly(ethylene oxide), a poly(vinylidene fluoride-co-hexafluoropropylene), a poly(methyl methacrylate), a carboxymethyl cellulose, a polyacrylonitrile, a polyvinylidene difluoride, a poly(vinyl alcohol), a polyvinylpyrrolidone, or combinations thereof.

In one aspect, the first solvent includes dimethyl carbonate, ethylmethyl carbonate, propylene carbonate, ethylene carbonate, diethyl carbonate, methyl propyl carbonate, tetrahydrofuran, ethyl acetate, dimethyl sulfoxide, acetonitrile, N-methyl-2-pyrrolidone, dimethoxyethane, dioxolane, γ-butyrolactone, acetone, N,N-dimethylformamide, alcohols such as isopropyl alcohol and butanol.

In one aspect, the second solvent includes at least one of ethylene carbonate, propylene carbonate, glycerol carbonate, vinylene carbonate, fluoroethylene carbonate, 1,2-butylene carbonate, γ-butyrolactone or δ-valerolactone, succinonitrile, glutaronitrile, adiponitrile; tetramethylene sulfone, ethyl methyl sulfone, vinyl sulfone, phenyl sulfone, 4-fluorophenyl sulfone, benzyl sulfone, triethylene glycol dimethylether, tetraethylene glycol dimethylether, 1,3-dimethoxy propane, 1,4-dioxane, triethyl phosphate, trimethyl phosphate, or an ionic liquid including an ionic cation and an ionic anion.

In one aspect, the lithium salt includes an anion selected from hexafluoroarsenate, hexafluorophosphate, bis(fluorosulfonyl)imide, perchlorate, tetrafluoroborate, cyclo-difluoromethane-1,1-bis(sulfonyl)imide, bis(trifluoromethanesulfonyl)imide, bis(perfluoroethanesulfonyl)imide, bis (oxalate)borate, difluoro(oxalato)borate, and bis (fluoromalonato)borate.

In one aspect, the electrolyte additive includes at least one of vinylene carbonate (VC), fluoroethylene carbonate (FEC), or lithium bis(oxolato)borate (LiBOB), lithium difluoro(oxalato)borate, N, N-diethylamino trimethyl silane, tris (2,2,2-trifluoroethyl) phosphate, vinylethylene carbonate, and 1,3-propane sultone.

In one aspect, the solid electrolyte includes an oxide-based particle, a metal-doped or aliovalent-substituted oxide particle, a sulfide-based particle, a nitride-based particle, a hydride-based particle, a halide-based particle, a borate-based particle, an inactive oxide, or combinations thereof.

In one aspect, the first electrolyte includes a negative electrode having a first plurality of negative solid-state electroactive particles.

In one aspect, the second electrolyte includes a bipolar electrode having a first side and a second side, and both the first side and second side are coated onto the each side of one current collector. The first side has a first plurality of positive solid-state electroactive particles, and the second side has a second plurality of negative solid-state electroactive particles.

In one aspect, the third electrolyte includes a positive electrode having a second plurality of positive solid-state electroactive particles.

In one aspect, the first electrode includes a negative electrode, the second electrode includes a bipolar electrode having a first side and a second side, and the third electrode includes a positive electrode. The mixture of the gel precursor solution and the solid electrolyte is applied to each of the negative electrode, the first side of the bipolar electrode, the second side of the bipolar electrode, and the positive electrode.

In one aspect, the first electrode includes a negative electrode, the second electrode includes a bipolar electrode having a first side and a second side, and the third electrode includes a positive electrode. The mixture of the gel precursor solution and the solid electrolyte is applied to one of the negative electrode and the first side of the bipolar electrode and one of the second side of the bipolar electrode and the positive electrode.

In one aspect, removing at least a portion of the first solvent from the mixture of gel precursor and solid electrolyte includes evaporating the first solvent.

In one aspect, the first electrode includes a negative electrode, the second electrode includes a bipolar electrode having a first side and a second side, and the third electrode includes a positive electrode. The negative electrode is positioned adjacent to the first side of the bipolar electrode (e.g., functioning as a positive electrode) and the positive electrode is positioned adjacent to the second side of the bipolar electrode (e.g., functioning as a negative electrode).

In one aspect, the method may further includes pressing the negative electrode, the bipolar electrode, and the positive electrode together.

In one aspect, the method further includes applying a polymer blocker to one or more of borders of the first electrode, the second electrode, or the third electrode.

In some aspects, a method for forming a bipolar solid-state battery includes applying a polymer blocker to one or more of borders of a first electrode, a second electrode, and a third electrode. The method also includes positioning one of the first electrode, the second electrode, and the third electrode with respect to another of the first electrode, the second electrode, and the third electrode. The method also include solidifying the polymer blocker.

In one aspect, the polymer blocker is applied to two of borders of the first electrode, the second electrode, and the third electrode.

In one aspect, the polymer blocker is applied to a border of the first electrode, the second electrode, or the third electrode.

In one aspect, the polymer blocker includes a hot-melt adhesive, a polyethylene resin, a polypropylene resin, a resin containing an amorphous polypropylene resin as a main component and obtained by copolymerization with ethylene, propylene, and butylene, a silicone, a polyimide resin, an epoxy resin, an acrylic resin, a rubber, an isocyanate adhesive, an acrylic resin adhesive, a cyanoacrylate adhesive, or combinations thereof.

In some aspects, a method for forming a bipolar solid-state battery includes preparing a mixture of gel precursor solution and solid electrolyte, wherein the gel precursor includes a polymer, a first solvent, and a liquid electrolyte, wherein the liquid electrolyte includes a second solvent and a lithium salt. The method also includes loading the mixture of the gel precursor solution and the solid electrolyte onto at least one of a negative electrode including a first plurality of negative solid-state electroactive particles, a first side of a bipolar electrode having a first plurality of positive solid-state electroactive particles, a second side of the bipolar electrode having a second plurality of negative solid-state electroactive particles, or a positive electrode having a second plurality of positive solid-state electroactive particles. The method also includes evaporating at least a portion of the first solvent from the mixture of gel precursor and solid electrolyte to form a gel. The method also includes applying a polymer blocker to borders of two of the negative electrode, the first side of the bipolar electrode, the second side of the bipolar electrode, and the positive electrode. The method also includes positioning the negative electrode adjacent to the first side of the bipolar electrode and the positive electrode adjacent to the second side of the bipolar electrode. The method also includes solidifying the polymer blocker. In various aspects, methods also include tab welding and cell sealing to obtain a gel-assisted bipolar solid-state battery.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
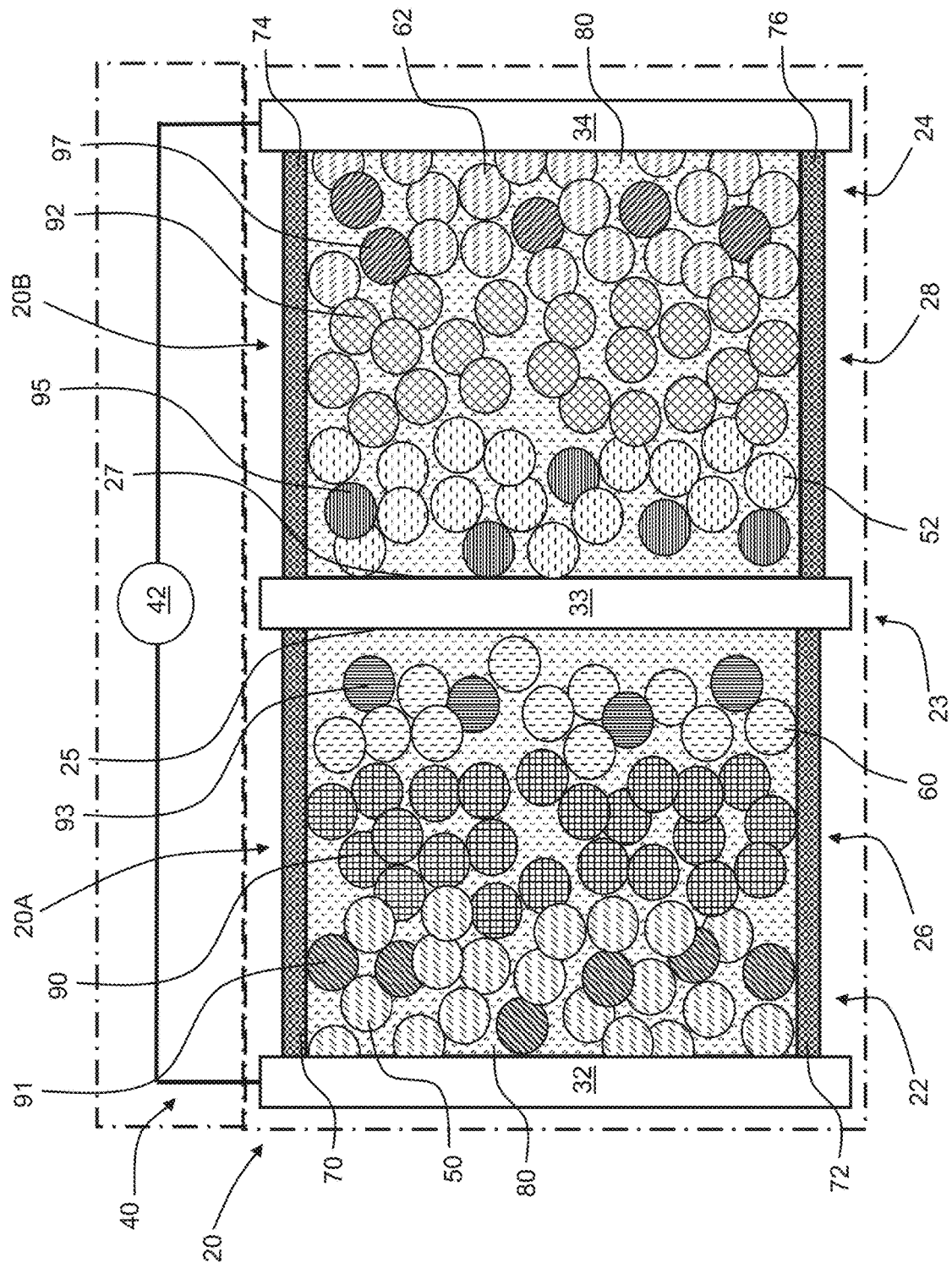
FIG. 1 is an illustration of an example bipolar solid-state battery.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current disclosure generally pertains to solid-state batteries (SSBs), for example a bipolar SSB, and to in-situ gelation methods to make such a bipolar SSB. Solid-state batteries may have a bipolar stacking design comprising a one or more bipolar electrodes where a first mixture of solid-state electroactive material particles (and optional solid-state electrolyte particles) is disposed on a first side of a current collector, and a second mixture of solid-state electroactive material particles (and optional solid-state electrolyte particles) is disposed on a second side of the current collector, which may be generally parallel with the first side of the current collector. The first mixture may include, as the solid-state electroactive material particles, cathode material particles. The second mixture may include, as solid-state electroactive material particles, anode material particles. The solid-state electrolyte particles in each instance may be the same or different.

An exemplary and schematic illustration of a solid-state electrochemical battery (also referred to as a "solid-state battery" and/or a "battery") 20 including a first cell 20A and a second cell 20B, that cycles lithium ions is shown in each of FIG. 1. The battery 20 includes a negative electrode (i.e., anode) 22, a bipolar electrode 23, a positive electrode (i.e., cathode) 24, a first solid-state electrolyte layer 26, and a second solid-state electrolyte layer 28.

The first solid-state electrolyte layer 26 and the second solid-state electrolyte layer 28 (collectively, the solid-state electrolyte layers 26, 28) are separating layers that physically separate each of the negative electrode (i.e., anode) 22 and the positive electrode (i.e., cathode) 24, respectively, from the bipolar electrode 23. The solid-state electrolyte layers 26, 28 may be defined by a first plurality of solid-state electrolyte particles 90 and a second plurality of solid-state electrolyte particles 92. In some aspects, a third plurality of solid-state electrolyte particles 91 may be mixed with a first plurality of negative solid-state electroactive particles 50 in the negative electrode 22 and a fourth plurality of solid-state electrolyte particles 93 may be mixed with a first plurality of positive solid-state electroactive particles 60 in the bipolar electrode 23 to, with the first solid-state electrolyte layer 26, form a continuous electrolyte network which may be a continuous or substantially continuous solid-state electrolyte network between the negative electrode 22 and the bipolar electrode 23. Also, a fifth plurality of solid-state electrolyte particles 95 may be mixed with a second plurality of negative solid-state electroactive particles 52 in the bipolar electrode 23 and a sixth plurality of solid-state electrolyte particles 97 may be mixed with a second plurality of positive solid-state electroactive particles 62 in the positive electrode 24 to, with the second solid-state electrolyte layer 28, form a continuous electrolyte network which may be a continuous or substantially continuous solid-state electrolyte network between the bipolar electrode 23 and the positive electrode 24. For example, the first and/or second negative solid-state electroactive particles 50, 52 and/or the first and/or second positive solid-state electroactive particles 60, 62 may be independently mixed with no electrolyte, or with the third, fourth, fifth, and sixth plurality of solid-state electrolyte particles 91, 93, 95, 97, respectively.

A negative electrode current collector 32 may be positioned at or near the negative electrode 22. The negative electrode current collector 32 may be formed from any suitable electrically conductive material known to those of skill in the art, for example, as discussed herein. A bipolar electrode current collector 33 may be positioned at or near the bipolar electrode 23. The bipolar electrode current collector 33 may be formed from any suitable electrically conductive material known to those of skill in the art, for example, as discussed herein. A positive electrode current collector 34 may be positioned at or near the positive electrode 24. The positive electrode current collector 34 may be formed from any suitable electrically conductive material known to those of skill in the art, for example, as discussed herein. The negative electrode current collector 32, the bipolar electrode current collector 33, and the positive electrode current collector 34, respectively, collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34).

Though the illustrated example includes a single positive electrode (i.e., cathode) 24 and a single negative electrode (i.e., anode) 22, the skilled artisan will recognize, upon viewing this disclosure, that the current teachings apply to various other configurations, including those having one or more cathodes and one or more anodes, as well as various current collectors with electroactive particle layers disposed on or adjacent to one or more surfaces thereof. Also, though the illustrated example includes a bipolar electrode 23, the skilled artisan will recognize that the current teachings apply to various other configurations, including those having multiple bipolar electrodes.

The battery 20 can generate an electric current during discharge by way of reversible electrochemical reactions that occur when the external circuit 40 is closed (to connect the negative electrode 22 and the positive electrode 24) and when the negative electrode 22 has a lower potential than the positive electrode 24. The chemical potential difference between the negative electrode 22 and the positive electrode 24 drives electrons produced by a reaction, for example, the oxidation of intercalated lithium, at the negative electrode 22, through the external circuit 40 towards the positive electrode 24. Lithium ions, which are also produced at the negative electrode 22, are concurrently transferred through the solid-state electrolyte layer 26 towards the bipolar electrode 23 from the bipolar electrode 23 toward the positive electrode 24. The electrons flow through the external circuit 40 and the lithium ions migrate across the first and second solid-state electrolyte layers 26, 28 toward the bipolar electrode 23 and the positive electrode 24, respectively, where they may be plated, reacted, or intercalated. The electric current passing through the external circuit 40 can be harnessed and directed through the load device 42 (in the direction of the arrows) until the lithium in the negative electrode 22 and the bipolar electrode is depleted and the capacity of the battery 20 is diminished.

The battery 20 can be charged or reenergized at any time by connecting an external power source (e.g., a charging device) to the battery 20 to reverse the electrochemical reactions that occur during battery discharge. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator. The connection of the external power source to the battery 20 promotes a reaction, for example, non-spontaneous oxidation of intercalated lithium, at the positive electrode 24 so that electrons and lithium ions are produced. The electrons, which flow back towards the negative electrode 22 through the external circuit 40, and the lithium ions, which move across the solid-state electrolyte layers 26, 28 back towards the negative electrode 22 and the bipolar electrode, respectively reunite at the negative electrode 22 and bipolar electrode, respectively, to replenish them with lithium for consumption during the next battery discharge cycle. As such, a complete discharging event followed by a complete charging event is considered to be a cycle, where lithium ions are cycled between the positive electrode 24 and the negative electrode 22.

In many of the configurations of the battery 20, each of the negative electrode current collector 32, the negative electrode 22, the solid-state electrolyte layer 26, the bipolar electrode (including the biopolar current collector 33) the positive electrode 24, and the positive electrode current collector 34 are prepared as relatively thin layers (for example, from several microns to a millimeter or less in thickness) and assembled in layers connected in series arrangement to provide a suitable electrical energy, battery voltage and power package. In various other instances, the battery 20 may further include electrodes 22, 24 connected in parallel to provide suitable electrical energy, battery voltage, and power.

In various aspects, the battery 20 may include a variety of other components that, while not depicted here, are nonetheless known to those of skill in the art. For example, the battery 20 may include a casing, a gasket, terminal caps, and any other conventional components or materials that may be situated within the battery 20, including between or around the negative electrode 22, the positive electrode 24, the bipolar electrode, and/or the solid-state electrolyte layers 26, 28.

As noted above, the size and shape of the battery 20 may vary depending on the particular applications for which it is designed. Battery-powered vehicles and hand-held consumer electronic devices are two examples where the battery 20 would most likely be designed to different size, capacity, and power-output specifications. As noted above, the battery 20 may also be connected in series or parallel with other similar lithium-ion cells or batteries to produce a greater voltage output, energy, and power if it is required by the load device 42. The battery 20 can generate an electric current to the load device 42 that can be operatively connected to the external circuit 40. The load device 42 may be fully or partially powered by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be an electricity-generating apparatus that charges the battery 20 for purposes of storing electrical energy.

The solid-state electrolyte layers 26, 28 provide electrical separation—for example, preventing physical contact-between the negative electrode 22 (i.e., an anode) and the bipolar electrode 23 and, likewise, between the bipolar electrode 23 and the positive electrode 24 (i.e., a cathode). The solid-state electrolyte layers 26, 28 also provide path of minimal resistance for internal passage of ions. In various aspects, as noted above, the solid-state electrolyte layers 26, 28 may be defined by a first plurality of solid-state electrolyte particles 90 and a second plurality of solid-state electrolyte particles 92, respectively. For example, the solid-state electrolyte layers 26, 28 may be in the form of a layer or a composite that includes the first and second plurality of solid-state electrolyte particles 90, 92. The solid-state electrolyte particles 90, 92 may have an average particle diameter greater than or equal to about 0.02 µm to less than or equal to about 20 µm, and in certain aspects, optionally greater than or equal to about 0.1 µm to less than or equal to about 10 µm. Though not illustrated, the skilled artisan will recognized that in certain instances, one or more binder particles may be mixed with the solid-state electrolyte particles 90, 92. For example, in certain aspects the solid-state electrolyte layers 26, 28 may include greater than or equal to about 0.5 wt. % to less than or equal to about 10 wt. % of the one or more binder. The one or more binders may include, for example only, polyvinylidene difluoride (PVDF), polytetrafluoroethylene (PTFE), ethylene propylene diene monomer (EPDM) rubber, nitrile butadiene rubber (NBR), styrene-butadiene rubber (SBR), and lithium polyacrylate (LiPAA).

The solid-state electrolyte layers 26, 28 may be in the form of a layer having a thickness greater than or equal to about 5 µm to less than or equal to about 200 µm, optionally greater than or equal to about 10 µm to less than or equal to about 100 µm, optionally about 40 µm, and in certain aspects, optionally about 20 µm.

In various aspects, the first and second plurality of solid-state electrolyte particles 90, 92 may include one or more oxide-based particles, metal-doped or aliovalent-substituted oxide particles, sulfide-based particles, nitride-based particles, hydride-based particles, halide-based particles, borate-based particles, and inactive oxides.

In certain variations, the oxide-based particles may include one or more garnet ceramics, LISICON-type oxides, NASICON-type oxides, and Perovskite type ceramics. For example, the garnet ceramics may be selected from the group consisting of: $Li_7La_3Zr_2O_{12}$, $Li_{6.2}Ga_{0.3}La_{2.95}Rb_{0.05}Zr_2O_{12}$, $Li_{6.55}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, and combinations thereof. The LISICON-type oxides may be selected from the group consisting of $Li_{2+2x}Zn_{1-x}GeO_4$ (where 0<x<1), $Li_{14}Zn(GeO_4)_4$, $Li_{3+x}(P_{1-x}Si_x)O_4$ (where 0<x<1), $Li_{3+x}Ge_xV_{1-x}O_4$ (where 0<x<1), and combinations thereof. The NASICON-type oxides may be defined by $LiMM'(PO_4)_3$, where M and M' are independently selected from Al, Ge, Ti, Sn, Hf, Zr, and La. For example, in certain variations, the NASICON-type oxides may be selected from the group consisting of: $Li_{1+x}Al_xGe_{2-x}(PO_4)_3$ (LAGP) (where 0≤x≤2), $Li_{1.4}Al_{0.4}Ti_{1.6}(PO_4)_3$, $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The Perovskite-type ceramics may be selected from the group consisting of: $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where x=0.75y and 0.60<y<0.75), $Li_{3/8}Sr_{7/16}Nb_{3/4}Zr_{1/4}O_3$, $Li_{3x}La_{(2/3-x)}TiO_3$ (where 0<x<0.25), and combinations thereof.

In certain variations, the metal-doped or aliovalent-substituted oxide particles may include, for example only, aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where 0<x<2 and 0<y<3), and combinations thereof.

In certain variations, the sulfide-based particles may include, for example only, $Li_2S$—$P_2S_5$ system, $Li_2S$—$P_2S_5$-$MO_x$ system (where 1<x<7), $Li_2S$—$P_2S_5$-$MS_x$ system (where 1<x<7), $Li_{10}GeP_2S_{12}$ (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$ (thio-LISICON), $Li_{10}SnP_2S_{12}$, $Li_{10}SiP_2S_{12}$, $Li_{9.54}Si_{1.74}P_{1.44}S_{11.7}Cl_{0.3}$, (1−x)$P_2S_5$-$_x$$Li_2S$ (where 0.5≤x≤0.7), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, $LiI$—$Li_4SnS_4$, $Li_4SnS_4$, and combinations thereof.

In certain variations, the nitride-based particles may include, for example only, $Li_3N$, $Li_7PN_4$, $LiSi_2N_3$, and combinations thereof, the hydride-based particles may include, for example only, $LiBH_4$, $LiBH_4$—$LiX$ (where x=Cl, Br, or I), $LiNH_2$, $Li_2NH$, $LiBH_4$—$LiNH_2$, $Li_3AlH_6$, and combinations thereof, the halide-based particles may include, for example only, $LiI$, $Li_3InCl_6$, $Li_2CdC_{14}$, $Li_2MgCl_4$, $LiCdI_4$, $Li_2ZnI_4$, $Li_3OCl$, and combinations thereof, the borate-based particles may include, for example only, $Li_2B_4O_7$, $Li_2O$—$B_2O_3$—$P_2O_5$, and combinations thereof, and/or the inactive oxides may include, for example only, $SiO_2$, $Al_2O_3$, $TiO_2$, and $ZrO_2$.

For example, in various aspects, the solid-state electrolyte particles 90, 92 may include one or more electrolyte materials selected from the group consisting of $Li_7La_3Zr_2O_{12}$, $Li_{6.2}Ga_{0.3}La_{2.95}Rb_{0.05}Zr_2O_{12}$, $Li_{6.55}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, $Li_{6.75}La_3Zr_{1.75}Nb_{0.25}O_{12}$, $Li_{2+2x}Zn_{1-x}GeO_4$ (where $0<x<1$), $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), $LiMM'(PO_4)_3$ (where M and M' are independently selected from Al, Ge, Ti, Sn, Hf, Zr, and La), $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where $x=0.75y$ and $0.60<y<0.75$), $Li_{3/8}Sr_{7/16}Nb_{3/4}Zr_{1/4}O_3$, $Li_{3x}La_{(2/3-x)}TiO_3$ (where $0<x<0.25$), aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where $0<x<2$ and $0<y<3$), $Li_2S$—$P_2S_5$ system, $Li_2S$—$P_2S_5$-$MO_x$ system (where $1<x<7$), $Li_2S$—$P_2S_5$-$MS_x$ system (where $1<x<7$), $Li_{10}GeP_2S_{12}$ (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$ (thio-LISICON), $Li_{10}SnP_2Si_2$, $Li_{10}SiP_2S_{12}$, $Li_{9.54}Si_{1.74}P_{1.44}S_{11.7}Cl_{0.3}$, $(1-x)P_2S_{5-x}Li_2S$ (where $0.5\leq x\leq 0.7$), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, LiI—$Li_4SnS_4$, $Li_4SnS_4$, $Li_3N$, $Li_7PN_4$, $LiSi_2N_3$, $LiBH_4$, $LiBH_4$—LiX (where x=Cl, Br, or I), $LiNH_2$, $Li_2NH$, $LiBH_4$—$LiNH_2$, $Li_3AlH_6$, LiI, $Li_3InCl_6$, $Li_2CdCl_4$, $Li_2MgCl_4$, $LiCdI_4$, $Li_2ZnI_4$, $Li_3OCl$, $Li_2B_4O_7$, $Li_2O$—$B_2O_3$—$P_2O_5$, and combinations thereof.

The first and second pluralities of solid-state electrolyte particles may be independently selected. For example, the first plurality of solid-state electrolyte particles 90 may be the same as or different from the second plurality of solid-state electrolyte particles 92. Additionally, one or more of the materials and/or compositions disclosed with respect to the first and second pluralities of solid-state electrolyte particles 90, 92 may be employed in the context of the third, fourth, fifth, and/or sixth pluralities of solid-state electrolyte particles 91, 93, 95, 97, respectively, as will be discussed. In various aspects, the various pluralities of solid-state electrolyte particles may be independently selected. For example, in various aspects, two or more of the first, second, third, fourth, fifth, and/or sixth pluralities of solid-state electrolyte particles 90 92, 91, 93, 95, 97, respectively, may be the same or may be different.

The negative electrode 22 may be formed from a lithium host material that is capable of functioning as a negative terminal of a lithium-ion battery. For example, in certain variations, the negative electrode 22 may be defined by the first plurality of the negative solid-state electroactive particles 50. In certain instances, the negative electrode 22 is a composite comprising a mixture of the first plurality of negative solid-state electroactive particles 50 and the third plurality of solid-state electrolyte particles 91. For example, the negative electrode 22 may include greater than or equal to about 30 wt. % to less than or equal to about 98 wt. %, and in certain aspects, optionally greater than or equal to about 50 wt. % to less than or equal to about 95 wt. %, of the first plurality of negative solid-state electroactive particles 50 and greater than or equal to about 0 wt. % to less than or equal to about 50 wt. %, and in certain aspects, optionally greater than or equal to about 5 wt. % to less than or equal to about 20 wt. %, of the third plurality of solid-state electrolyte particles 91.

In certain variations, the first plurality of negative solid-state electroactive particles 50 may be lithium-based, for example, a lithium alloy. In other variations, the first plurality of negative solid-state electroactive particles 50 may be silicon-based comprising, for example, a silicon alloy and/or silicon-graphite mixture. In still other variations, the negative electrode 22 may be a carbonaceous anode and the first plurality of negative solid-state electroactive particles 50 may include one or more negative electroactive materials, such as graphite, graphene, hard carbon, soft carbon, and carbon nanotubes (CNTs). In still further variations, the negative electrode 22 may include one or more negative electroactive materials, such as lithium titanium oxide ($Li_4T_{15}O_2$); one or more metal oxides, such as $TiO_2$ and/or $V_2O_5$; and metal sulfides, such as FeS. Thus, the negative solid-state electroactive particles 50 may be selected from the group including, for example only, lithium, graphite, graphene, hard carbon, soft carbon, carbon nanotubes, silicon, silicon-containing alloys, tin-containing alloys, and combinations thereof.

In certain variations, the negative electrode 22 may further include one or more conductive additives and/or binder materials. For example, the negative solid-state electroactive particles 50 (and/or third plurality of solid-state electrolyte particles 91) may be optionally intermingled with one or more electrically conductive materials (not shown) that provide an electron conduction path and/or at least one polymeric binder material (not shown) that improves the structural integrity of the negative electrode 22.

For example, the first plurality of negative solid-state electroactive particles 50 (and/or third plurality of solid-state electrolyte particles 91) may be optionally intermingled with binders, such as polyvinylidene difluoride (PVDF), polytetrafluoroethylene (PTFE), ethylene propylene diene monomer (EPDM) rubber, nitrile butadiene rubber (NBR), styrene-butadiene rubber (SBR), and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as graphene oxide), carbon black (such as Super P), and the like. Examples of a conductive polymer may include polyaniline, polythiophene, polyacetylene, polypyrrole, and the like. In certain aspects, mixtures of the conductive additives and/or binder materials may be used.

The negative electrode 22 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

The positive electrode 24 may be formed from a lithium-based or electroactive material that can undergo lithium intercalation and deintercalation while functioning as the positive terminal of the battery 20. For example, in certain variations, the positive electrode 24 may be defined by the second plurality of positive solid-state electroactive particles 62. In certain instances, as illustrated, the positive electrode 24 is a composite comprising a mixture of the second plurality of positive solid-state electroactive particles 62 and the sixth plurality of solid-state electrolyte particles 97. For example, the positive electrode 24 may include greater than or equal to about 30 wt. % to less than or equal to about 98 wt. %, and in certain aspects, optionally greater than or equal to about 50 wt. % to less than or equal to about 95 wt. %, of the second plurality of positive solid-state electroactive particles 62 and greater than or equal to about 0 wt. % to less than or equal to about 50 wt. %, and in certain aspects, optionally greater than or equal to about 5 wt. % to less than or equal to about 20 wt. %, of the sixth plurality of solid-state electrolyte particles 97.

In certain variations, the positive electrode 24 may be one of a layered-oxide cathode, a spinel cathode, and a polyanion cathode. For example, in the instances of a layered-oxide cathode (e.g., rock salt layered oxides), the positive solid-state electroactive particles 60 may include one or more positive electroactive materials selected from $LiCoO_2$, $LiNi_xMn_yCo_{1-x-y}O_2$ (where $0 \leq x \leq 1$ and $0 \leq y \leq 1$), $LiNi_xMn_yAl_{1-x-y}O_2$ (where $0 \leq x \leq 1$ and $0 \leq y \leq 1$), $LiNi_xMn_{1-x}O_2$ (where $0 \leq x \leq 1$), and $Li_{1+x}MO_2$ (where $0 \leq x \leq 1$) for solid-state lithium-ion batteries. The spinel cathode may include one or more positive electroactive materials, such as $LiMn_2O_4$ and $LiNi_{0.5}Mn_{1.5}O_4$. The polyanion cation may include, for example, a phosphate, such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$ for lithium-ion batteries, and/or a silicate, such as $LiFeSiO_4$ for lithium-ion batteries. In this fashion, in various aspects, the positive solid-state electroactive particles 60 may include one or more positive electroactive materials selected from the group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where $0 \leq x \leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof. In certain aspects, the positive solid-state electroactive particles 60 may be coated (for example, by $LiNbO_3$ and/or $Al_2O_3$) and/or the positive electroactive material may be doped (for example, by aluminum and/or magnesium).

In certain variations, the positive electrode 24 may further include one or more conductive additives and/or binder materials. For example, the second plurality of positive solid-state electroactive particles 62 (and/or sixth plurality of solid-state electrolyte particles 97) may be optionally intermingled with one or more electrically conductive materials that provide an electron conduction path and/or at least one polymeric binder material (not shown) that improves the structural integrity of the positive electrode 24.

For example, the second plurality of positive solid-state electroactive particles 62 (and/or sixth plurality of solid-state electrolyte particles 97) may be optionally intermingled with binders, like polyvinylidene difluoride (PVDF), polytetrafluoroethylene (PTFE), ethylene propylene diene monomer (EPDM) rubber, nitrile butadiene rubber (NBR), styrene-butadiene rubber (SBR), and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as graphene oxide), carbon black (such as Super P), and the like. Examples of a conductive polymer may include polyaniline, polythiophene, polyacetylene, polypyrrole, and the like. In certain aspects, mixtures of the conductive additives and/or binder materials may be used.

The positive electrode 24 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

The bipolar electrode 23 includes a first side (e.g., surface) 25 and a second side (e.g., surface) 27 generally opposite and parallel to the first side 25. The first side 25 includes a plurality of electroactive material particles disposed adjacent to or on a first side 25, for example, on a surface of, the bipolar electrode current collector 33 and the second side 27 includes another plurality of electroactive material particles disposed adjacent to or on a second side 27, for example, on a surface of, the bipolar electrode current collector 33. As illustrated in FIG. 1, the first side 25 may face the negative electrode 22 and/or be disposed proximate to (relative to the second side 27) the negative electrode 22 and the second side 27 may face the positive electrode 24 and/or be disposed proximate to (relative to the first side 25) the positive electrode 24.

In some aspects, the first side 25 of the bipolar current collector 33 may include a lithium-based or electroactive material that can undergo lithium intercalation and deintercalation, as similarly discussed with respect to the positive electrode 24. For example, in certain variations, the first side 25 of the bipolar current collector 33 may be defined by the first plurality of the positive solid-state electroactive particles 60. In certain instances, as illustrated, the first side 25 of the bipolar current collector 33 is a composite comprising a mixture of the first plurality of positive solid-state electroactive particles 60 and the fourth plurality of solid-state electrolyte particles 93. For example, the first side 25 of the bipolar current collector 33 may include greater than or equal to about 30 wt. % to less than or equal to about 98 wt. %, and in certain aspects, optionally greater than or equal to about 50 wt. % to less than or equal to about 95 wt. %, of the first plurality of positive solid-state electroactive particles 60 and greater than or equal to about 0 wt. % to less than or equal to about 50 wt. %, and in certain aspects, optionally greater than or equal to about 5 wt. % to less than or equal to about 20 wt. %, of the fourth plurality of solid-state electrolyte particles 93.

In certain variations, the first side 25 of the bipolar current collector 33 may be one of a layered-oxide cathode, a spinel cathode, and a polyanion cathode, for example, as similarly discussed with respect to the positive electrode 24. The first plurality of positive solid-state electroactive particles 60 and the second plurality of positive sold-state electroactive particles 62 may be independently selected. Also, the first side 25 of the bipolar current collector 33 may include additional components, such as those discussed with respect to the positive electrode 24, for example, conductive additives and/or binder materials In some aspects, the second side 27 of the bipolar current collector 33 may include may include a lithium host material, similarly discussed with respect to the negative electrode 22. For example, in certain variations, the second side 27 of the bipolar current collector 33 may be defined by the second plurality of negative solid-state electroactive particles 52. In certain instances, the second side 27 of the bipolar current collector 33 is a composite comprising a mixture of the second plurality of negative solid-state electroactive particles 52 and the fifth plurality of solid-state electrolyte particles 95. For example, the second side 27 of the bipolar current collector 33 may include greater than or equal to about 30 wt. % to less than or equal to about 98 wt. %, and in certain aspects, optionally greater than or equal to about 50 wt. % to less than or equal to about 95 wt. %, of the second plurality of negative solid-state electroactive particles 52 and greater than or equal to about 0 wt. % to less than or equal to about 50 wt. %, and in certain aspects, optionally greater than or equal to about 5 wt. % to less than or equal to about 20 wt. %, of the fifth plurality of solid-state electrolyte particles 95.

In certain variations, the second plurality of negative solid-state electroactive particles 52 may include one or more of those materials as similarly discussed with respect to the negative electrode 22. Also, the second side 27 of the bipolar current collector 33 may include additional components, such as those discussed with respect to the negative electrode 22, for example, conductive additives and/or binder materials.

In some variations, the bipolar current collector 33 may have a thickness greater than or equal to about 2 µm to less than or equal to about 60 µm, and in certain aspects, optionally greater than or equal to about 5 µm to less than or equal to about 30 µm. The bipolar current collector 33 may include at least one of stainless steel, aluminum, nickel, iron, titanium, copper, tin, or any other electrically conductive material known to those of skill in the art. In certain variations, the bipolar current collector 33 may be a cladded foil, for example, where one side (e.g., the first side 25 or the second side 27) of the bipolar current collector 33 includes one metal (e.g., first metal) and another side (e.g., the other of the first side 25 or the second side 27) of the bipolar current collector 33 includes another metal (e.g., second metal)) including, for example only, aluminum-copper (Al—Cu), nickel-copper (Ni—Cu), stainless steel-copper (SS—Cu), aluminum-nickel (Al—Ni), aluminum-stainless steel (Al—SS), and nickel-stainless steel (Ni—SS). In certain variations, the bipolar current collector 33 may be pre-coated, such as carbon-coated aluminum current collectors.

In other variations, the bipolar current collector 33 may be configured as a bilayer current collector, for example, including a first current collector and a second current collector. For example, in such variations, the first current collector may define the first side 25 of the bipolar current collector 33 and the second current collector may define the second side 27 of the bipolar current collector 33. The first current collector may be different from the second current collector. In certain variations, the first current collector may function as a positive electrode current collector and the second current collector may function as a negative electrode current collector. In each instance, the first and second current collectors may each include at least one of stainless steel, aluminum, nickel, iron, titanium, copper, tin, or any other electrically conductive material known to those of skill in the art. The first and second current collectors may each have a thickness such that the bipolar current collector 33 has a thickness greater than or equal to about 2 µm to less than or equal to about 60 µm, and in certain aspects, optionally greater than or equal to about 5 µm to less than or equal to about 20 µm.

In some aspects, the negative electrode 22, the bipolar electrode 23, the positive electrode 24, and/or the first and second solid-state electrolyte layers 26, 28 may be characterized with respect to the spaces between various particles of these components. For example, the negative electrode 22, the bipolar electrode 23, the positive electrode 24, and/or the first and second solid-state electrolyte layers 26, 28 may be characterized as having an interparticle space, for example, at interstices between various particles. In various aspects, the interparticle space may be greater than or equal to about 0 vol. % to less than or equal to about 60 vol. %. of the negative electrode 22, the bipolar electrode 23, the positive electrode 24, and/or the first and second solid-state electrolyte layers 26, 28.

Referring again to FIG. 1, in some aspects, at least a portion of the interparticle space may be filled with a gel 80. For example, the gel 80 may surround the various particles, for example, the first, second, third, fourth, fifth, and/or sixth plurality of solid-state electrolyte particles 90, 92, 91, 93, 95, 97, the first and/or second plurality of negative solid-state electroactive particles 50, 52, and the first and second positive solid-state electroactive particles 60, 62. In various aspects, the gel 80 may fill a portion, substantially all, or all of the interparticle space, for example, at least about 50%, alternatively, at least about 55%, alternatively, at least about 60%, alternatively, at least about 65%, alternatively, at least about 70%, at least about 75%, alternatively, at least about 80%, alternatively, at least about 85%, alternatively, at least about 90%, alternatively, at least about 95%, alternatively, about 100% of the interparticle space may be filled by the gel.

As in the instance of, for example FIG. 1, the gel 80 may be disposed within the interparticle spaces so as to wet interfaces and/or fill void spaces between the first, second, third, fourth, fifth, and/or sixth plurality of solid-state electrolyte particles 90, 92, 91, 93, 95, 97, the first and/or second plurality of negative solid-state electroactive particles 50, 52, and the first and second positive solid-state electroactive particles 60, 62, so as to, for example only, reduce interparticle porosity and improve ionic contact.

In certain variations, the battery 20 (or the first cell 20A and/or the second cell 20B) may include one or more polymer blockers. For example, a polymer blocker may be disposed at or adjacent to a border of a cell unit so as to mitigate a potential ionic short-circuit. For example, one or more polymer blockers may contact or connect one or more current collectors at or adjacent to the border of a cell unit, for example, to fully seal the cell unit. Referring again to FIG. 1, a first polymer blocker 70 and a second polymer blocker 72 may be disposed at or towards the respective ends of the first cell 20A, for example, spanning the space between the negative electrode 22 and the bipolar electrode 23. Also, a third polymer blocker 74 and a fourth polymer blocker 76 may be disposed at or towards the respective ends of the second cell 20B, for example, spanning the space between the bipolar electrode 23 and the positive electrode 24. Although FIG. 1 illustrates a polymer blocker pair disposed at the respective ends of both the first cell 20A and the second cell 20B, the skilled artisan will appreciate that in some aspects, a polymer blocker may be applied to only one end of a particular cell, may be absent from a particular cell, or may be entirely absent from the battery.

The polymer blockers 70, 72, 74, and 76 may include an ionic and electronic insulating material which may be characterized as having a strong adhesion force (for example, greater than or equal to about 0.01 MPa to less than or equal to about 1000 MPa, and in certain aspects, optionally greater than or equal to about 0.1 MPa to less than or equal to about 40 MPa). The ionic and/or electronic insulating material may also be characterized as exhibiting excellent thermo-stability (for example, stability at greater than or equal to about 40° C. to less than or equal to about 200° C., and in certain aspects, optionally greater than or equal to about 45°

C. to less than or equal to about 150° C.). For example, one of more of the polymer blockers 70, 72, 74, 76, may include at least one of a hot-melt adhesive (such as urethane resin, polyamide resin, polyolefin resin); a polyethylene resin; a polypropylene resin; a resin containing an amorphous polypropylene resin as a main component and obtained by copolymerizing, for example, ethylene, propylene, and butene; silicone; a polyimide resin; an epoxy resin; an acrylic resin; a rubber (such as ethylene-propylenediene rubber (EPDM)); an isocyanate adhesive; an acrylic resin adhesive; and a cyanoacrylate adhesive. In various aspects, one or more of the polymer blockers 70, 72, 74, 76 may have a thickness greater than or equal to about 2 μm to less than or equal to about 2000 μm, and in certain aspects, optionally greater than or equal to about 40 μm to less than or equal to about 400 μm.

In various aspects, as illustrated in FIGS. 2-5, a solid-state battery, such as the battery 20 described with respect to FIG. 1, having solid-state electrolyte layers may be formed by way of a method that generally comprises the steps of preparing a mixture of gel precursor solution and solid electrolyte; loading the mixture of gel precursor solution and solid electrolyte onto at least one of three or more electrodes (e.g., a first, second, and third electrode); removing at least a portion of a solvent from the mixture of gel precursor solution and solid electrolyte to form the gel; applying a polymer blocker to one or more of the electrodes; and stacking the electrodes.

In some aspects, the gel precursor solution may be prepared and, then, mixed with the solid electrolyte. The gel precursor solution may generally include a polymer, a first solvent suitable to dissolve the polymer, and a liquid electrolyte. In various aspects, the polymer may be present in the gel precursor solution at a rate from about 0.1% by weight of the gel precursor solution to about 50% by weight of the gel precursor solution; the first solvent may be present in the gel precursor solution at a rate from about 10% by weight of the gel precursor solution to about 80% by weight of the gel precursor solution; and the liquid electrolyte may be present in the gel precursor solution at a rate from about 5% by weight of the gel precursor solution to about 90% by weight of the gel precursor solution.

The polymer may include, for example only, one or more organic polymers. The one or more organic polymers may include, for example only, poly(ethylene oxide)s (PEO)

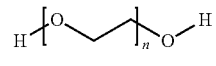

where $1000 \leq n \leq 10{,}000{,}000$; one or more poly(vinylidene fluoride-co-hexafluoropropylene)s (PVDF═HFP)

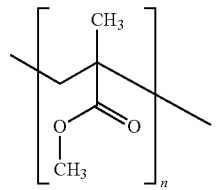

where $1{,}000 \leq x \leq 10{,}000{,}000$ and $1{,}000 \leq y \leq 10{,}000{,}000$; one or more poly(methyl methacrylate)s (PMMA)

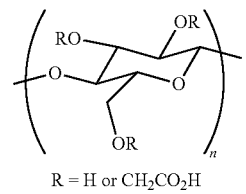

where $1{,}000 \leq n \leq 10{,}000{,}000$; one or more carboxymethyl celluloses (CMC)

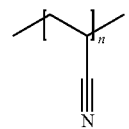

R = H or CH$_2$CO$_2$H where $1{,}000 \leq n \leq 10{,}000{,}000$; one or more polyacrylonitriles (PAN)

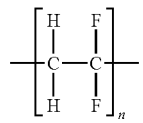

where $1{,}000 \leq n \leq 10{,}000{,}000$; one or more polyvinylidene difluorides (PVDF)

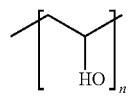

where $1{,}000 \leq n \leq 10{,}000{,}000$; one or more poly(vinyl alcohol)s (PVA)

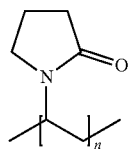

where $1{,}000 \leq n \leq 10{,}000{,}000$; one or more polyvinylpyrrolidones (PVP)

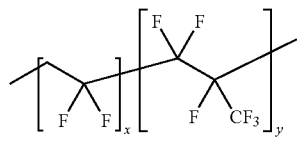

where $1{,}000 \leq n \leq 10{,}000{,}000$; and combinations thereof.

The first solvent may be a low-boiling-point solvent and may be selected to dissolve the polymer. The solvent may include, for example only, at least one of dimethyl carbonate (DMC), ethylmethyl carbonate (EMC), propylene carbonate (PC), ethylene carbonate (EC), diethyl carbonate (DEC), methyl propyl carbonate (MPC), tetrahydrofuran, ethyl acetate, dimethyl sulfoxide, acetonitrile, N-methyl-2-pyrrolidone (NMP), dimethoxyethane, dioxolane, γ-butyrolactone, acetone, N,N-dimethylformamide (DMF), alcohols such as isopropyl alcohol and butanol.

The polymer and the first solvent may be mixed under suitable conditions to form the gel precursor solution. For example, the polymer and first solvent may be mixed at a temperature, for example, at least 55° C., or about 60° C., or about 65° C.

The liquid electrolyte may include one or more lithium salts, for example, having a lithium cation and an anion, and in certain variations, a second solvent. For example, the one or more lithium salts may include a lithium cation and anion, such as hexafluoroarsenate, hexafluorophosphate, bis(fluorosulfonyl)imide (FSI), perchlorate, tetrafluoroborate, cyclo-difluoromethane-1,1-bis(sulfonyl)imide (DMSI), bis(trifluoromethanesulfonyl)imide (TFSI), bis(perfluoroethanesulfonyl)imide (BETI), bis(oxalate)borate (BOB), difluoro(oxalato)borate (DFOB), and/or bis(fluoromalonato)borate (BFMB), by way of non-limiting example.

The second solvent, may be a relatively high-boiling-point solvent and may be selected to dissolve the one or more lithium salts, for example, to enable a good lithium ion conductivity. For example, the second solvent, generally, may be selected to exhibit a relatively low vapor pressure, for example, based upon the specifics of the method discussed. In various aspects, the second solvent may include, one or more of a carbonate such as ethylene carbonate (EC), propylene carbonate (PC), glycerol carbonate, vinylene carbonate, fluoroethylene carbonate, or 1,2-butylene carbonate; a lactone such as γ-butyrolactone or δ-valerolactone; a nitrile such as succinonitrile, glutaronitrile, or adiponitrile; a sulfone such as tetramethylene sulfone, ethyl methyl sulfone, vinyl sulfone, phenyl sulfone, 4-fluorophenyl sulfone, or benzyl sulfone; an ether such as triethylene glycol dimethylether (triglyme, G3), tetraethylene glycol dimethylether (tetraglyme, G4), 1,3-dimethoxy propane, or 1,4-dioxane, a phosphate such as triethyl phosphate or trimethyl phosphate, and/or ionic liquid including an ionic cation and an ionic anion. Examples of suitable ionic cations may include $[Emim]^+$ (1-Ethyl-3-methylimidazolium), $[PP_{13}]^+$ (1-Propyl-1-methylpiperidinium), $[PP_{14}]^+$ (1-Butyl-1-methylpiperidinium); $[Pyr_{12}]^+$ (1-Methyl-1-ethylpyrrolidinium); $[Pyr_{13}]^+$ (1-Propyl-1-methylpyrrolidinium); or $[Pyr_{14}]^+$ (1-Butyl-1-methylpyrrolidinium). Examples of suitable ionic anions include bis(trifluoromethanesulfonyl)imide (TFSI) or bis(fluorosulfonyl)imide (FSI). In some aspects, the second solvent may be selected based upon the first solvent. For example, in some variations, the second solvent may be selected to have a higher boiling point than the first solvent.

In some aspects, the liquid electrolyte may include an electrolyte additive. The electrolyte additive may include at least one of vinylene carbonate (VC), fluoroethylene carbonate (FEC), or lithium bis(oxolato) borate (LiBOB), lithium difluoro(oxalato) borate, N, N-diethylamino trimethyl silane, tris (2,2,2-trifluoroethyl) phosphate, vinylethylene carbonate, and 1,3-propane sultone.

The solid electrolyte mixed with gel precursor solution may include one or more of the solid-state electrolyte materials such as detailed above. In various aspects, the solid electrolyte and the gel precursor solution may be mixed at a weight ratio of solid electrolyte to gel precursor solution from about 0:100 to about 95:5.

Figure 2:
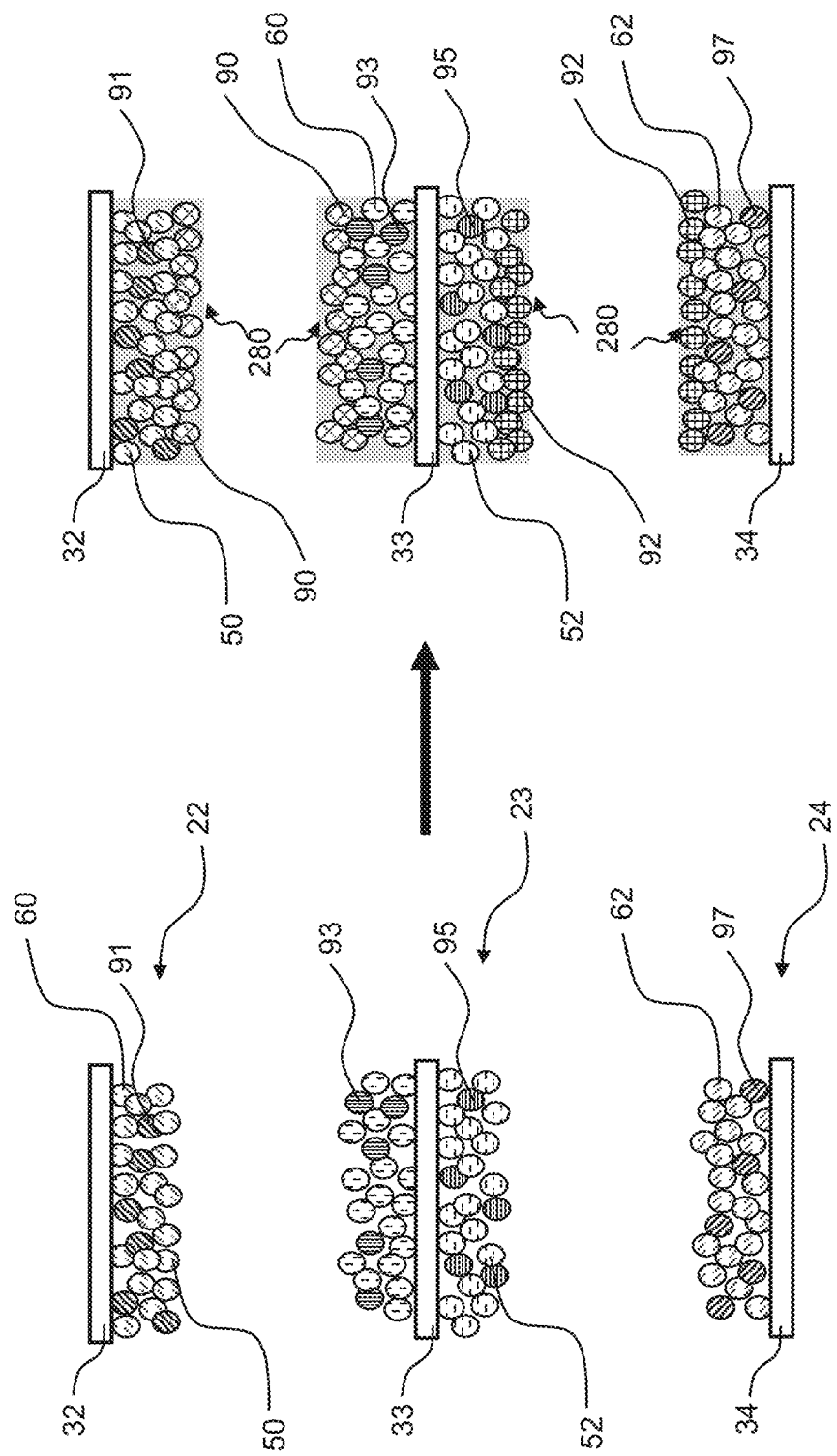
FIG. 2 is an illustration of an example of one or more steps in a method for forming a solid-state battery in accordance with various aspects of the current technology.

Referring to FIG. 2, the mixture of gel precursor solution and solid electrolyte 280 may be loaded onto one or more electrodes. For example, as illustrated in FIG. 2, the mixture of gel precursor solution and solid electrolyte may be loaded onto each of a first electrode (e.g., the negative electrode 22 as detailed with respect to FIG. 1), a second electrode (e.g., the bipolar electrode 23 as detailed with respect to FIG. 1), and a third electrode (the positive electrode 24 as detailed with respect to FIG. 1). In various aspects, the mixture of gel precursor solution and solid electrolyte may be loaded onto the one or more of the electrodes by drop coating, dip coating, spray coating, or doctor blade coating.

As illustrated in FIG. 2, in some aspects, prior to the deposition of the mixture of gel precursor solution and solid electrolyte 280, the negative electrode 22 may include the first plurality of negative solid-state electroactive particles 50 and, optionally, a third plurality of solid-state electrolyte particles 91. The first plurality of negative solid-state electroactive particles 50 and, optionally, the third plurality of solid-state electrolyte particles 91, may be disposed as a layer adjacent to a surface of a negative current collector 32.

As also illustrated in FIG. 2, prior to the deposition of the mixture of gel precursor solution and solid electrolyte the bipolar electrode 23 may include the first plurality of positive solid-state electroactive particles 60 and, optionally, a fourth plurality of solid-state electrolyte particles 93 and, also, the second plurality of negative solid-state electroactive particles 52 and, optionally, a fifth plurality of solid-state electrolyte particles 95. The first plurality of positive solid-state electroactive particles 62 and, optionally, the fourth plurality of solid-state electrolyte particles 93, may be disposed as a layer adjacent to the first surface (FIG. 1, 25) of the bipolar current collector 33 and, also, the second plurality of negative solid-state electroactive particles 52 and, optionally, the fifth plurality of solid-state electrolyte particles 95, may be disposed as a layer adjacent to the second surface (FIG. 1, 27) of the bipolar current collector 32.

As also illustrated in FIG. 2, prior to the deposition of the mixture of gel precursor solution and solid electrolyte, the positive electrode 24 may include the second plurality of positive solid-state electroactive particles 62 and, optionally, a sixth plurality of solid-state electrolyte particles 97. The second plurality of positive solid-state electroactive particles 62 and, optionally, the sixth plurality of solid-state electrolyte particles 97, may be disposed as a layer adjacent to a surface of a positive electrode current collector 34.

Although FIG. 2 illustrates the mixture of solid electrolyte and gel precursor solution loaded onto each of the negative electrode 22, the positive electrode 24, and both surfaces of the bipolar electrode 23, in some aspects, the mixture of solid electrolyte and gel precursor solution could be only coated onto only one electrode for each cell, for example, either the negative electrode 22 or the first surface (FIG. 1, 25) of the bipolar electrode and/or either the second surface (FIG. 1, 27) of the bipolar electrode 23 or the positive electrode 24. For example, in some aspects, only the gel precursor solution (e.g., absent any solid electrolyte) may be applied to the negative electrode 22, the positive electrode 24, or one of the surfaces of the bipolar electrode 23.

As illustrated in FIG. 2, once the mixture of gel precursor solution and solid electrolyte 280 has been loaded onto the one or more electrodes, the solid electrolyte may be deposited in a layer on the surface of the one or more electrodes.

For example, a portion of the first plurality of solid-state electrolyte particles 90 may be deposited in a layer on the negative electrode 22 and the first surface (FIG. 1, 25) of the bipolar electrode and a portion of the second plurality of solid-state electrolyte particles 92 may be deposited in a layer on the positive electrode 24 and the second surface (FIG. 1, 27) of the bipolar electrode. In some aspects, each of the layers including a portion of the first and second plurality of electrolyte particles may have a thickness greater than or equal to about 5 µm to less than or equal to about 200 µm, optionally greater than or equal to about 10 µm to less than or equal to about 100 µm, optionally about 40 µm, and in certain aspects, optionally about 20 µm.

As also illustrated in FIG. 2, once the mixture of gel precursor solution and solid electrolyte 280 has been loaded onto the one or more electrodes, the gel precursor solution may impregnate and at least partially fill the interparticle spaces between the various particles.

Figure 3:
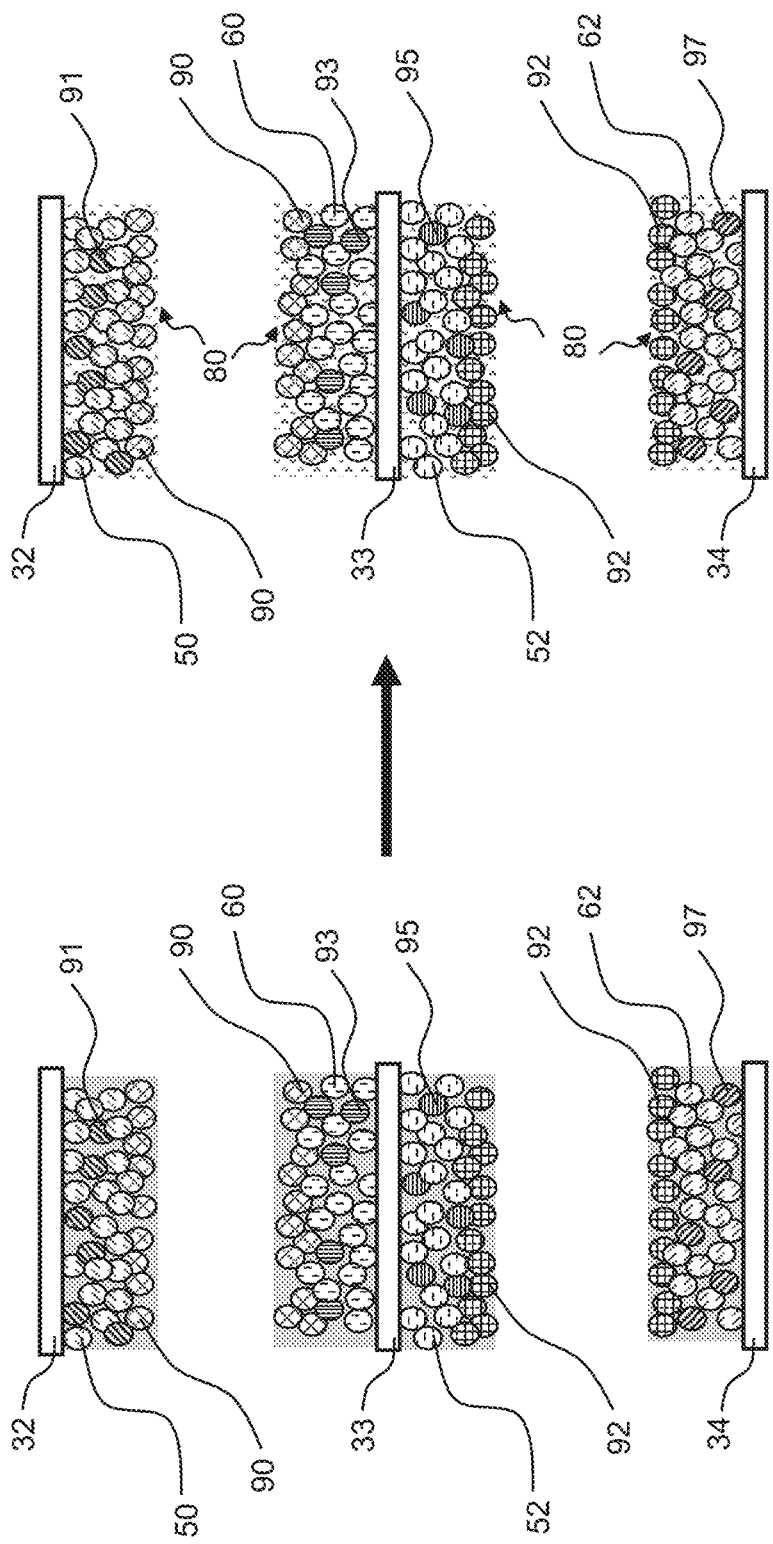
FIG. 3 is an illustration of an example of one or more steps in a method for forming a solid-state battery in accordance with various aspects of the current technology.

Referring to FIG. 3, in some aspects at least a portion (e.g., substantially all or all) of the first solvent may be removed from the gel precursor solution to, in situ, form the gel. For example, evaporating the first solvent from the precursor solution may be effective to cause in situ gelation of the polymer. In some aspects, the first solvent may be evaporated from the gel precursor solution by exposing the electrodes having the mixture of gel precursor solution and solid electrolyte (alternatively, only gel precursor solution) to temperatures of from about 10° C. to about 100° C. for a suitable duration, for example, from about 30 minutes to about 24 hours. In some aspect, once the first solvent has been removed from the gel precursor solution, the gel 80 may be formed. The gel 80 may be non-flowing. As similarly discussed with respect to FIG. 1, the gel 80 may fill a portion, substantially all, or all of the interparticle space, for example, at least about 50%, alternatively, at least about 55%, alternatively, at least about 60%, alternatively, at least about 65%, alternatively, at least about 70%, at least about 75%, alternatively, at least about 80%, alternatively, at least about 85%, alternatively, at least about 90%, alternatively, at least about 95%, alternatively, about 100% of the interparticle space may be filled by the gel.

Figure 4:
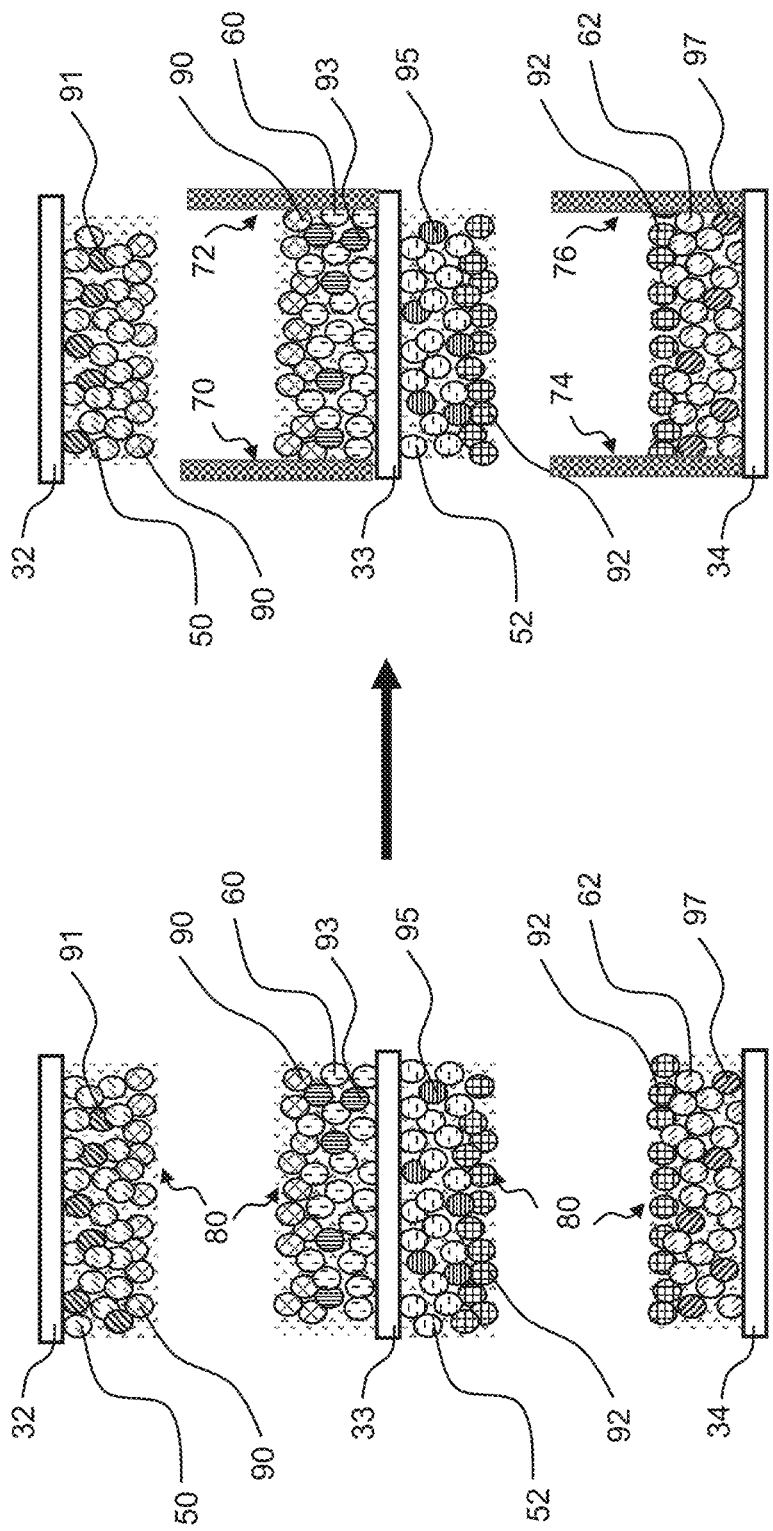
FIG. 4 is an illustration of an example of one or more steps in a method for forming a solid-state battery in accordance with various aspects of the current technology.

Referring to FIG. 4, in some aspects, a polymer blocker may be applied to one or more borders of a cell. For example, the first, second, third, and fourth polymer blockers 70, 72, 74, 76, as discussed with respect to FIG. 1, may be applied to one or more borders of an electrode. For example, as shown in FIG. 4, the first polymer blocker 70 and second polymer blocker 72 may be applied to the borders of the bipolar electrode (FIG. 1, 23) and the third polymer blocker 74 and fourth polymer blocker 76 may be applied to the positive electrode (FIG. 1, 24). In other aspects, a portion of a polymer blocker may be applied to multiple electrodes or no polymer blocker may be applied.

In some aspects, the polymer blocker may have a dimension that is at least 100% of the combined thickness of the electrodes to which the polymer blocker is applied and not more than 120% of the combined thickness of the electrodes to which the polymer blocker is applied. In some aspects, the polymer blocker may be applied in a non-solid form, for example, such that the polymer blocker is malleable, pliable, or flexible.

Figure 5:
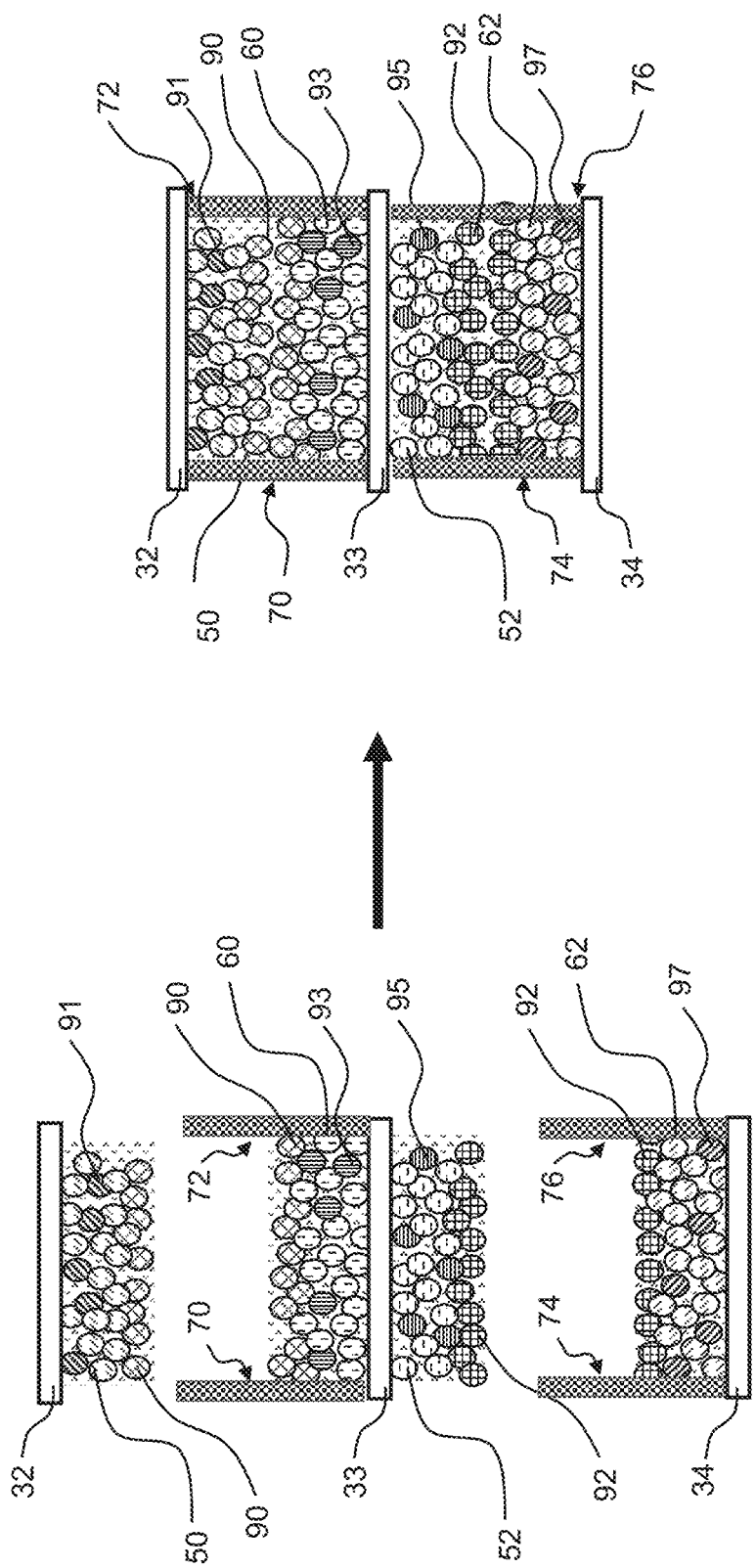
FIG. 5 is an illustration of an example of one or more steps in a method for forming a solid-state battery in accordance with various aspects of the current technology.

Referring to FIG. 5, the electrodes may be positioned with respect to one another, for example, stacked. For example, the negative electrode 22 may be disposed adjacent to the first side (FIG. 1, 25) of the bipolar electrode 23 and the positive electrode 24 may be disposed adjacent to second side (FIG. 1, 27) of the bipolar electrode. In some aspects, after positioning the electrodes with respect to each other (e.g., the negative electrode 22 adjacent to the first side of the bipolar electrode 23 and the positive electrode 24 adjacent to second side of the bipolar electrode), the electrodes may be pressed together, for example, to ensure intimate contact between the various layers. For example, in some aspects, a pressure of from 0 MPa to about 500 MPa may be applied to press the electrodes together. In some aspects, with the electrodes disposed with respect to each other, the polymer blockers may be solidified, such as by exposing the polymer blockers to a heat source. For example, the polymer blockers may be solidified by exposure to temperatures of at least about 60° C., or at least about 100° C., or about 120° C.

Figure 6:
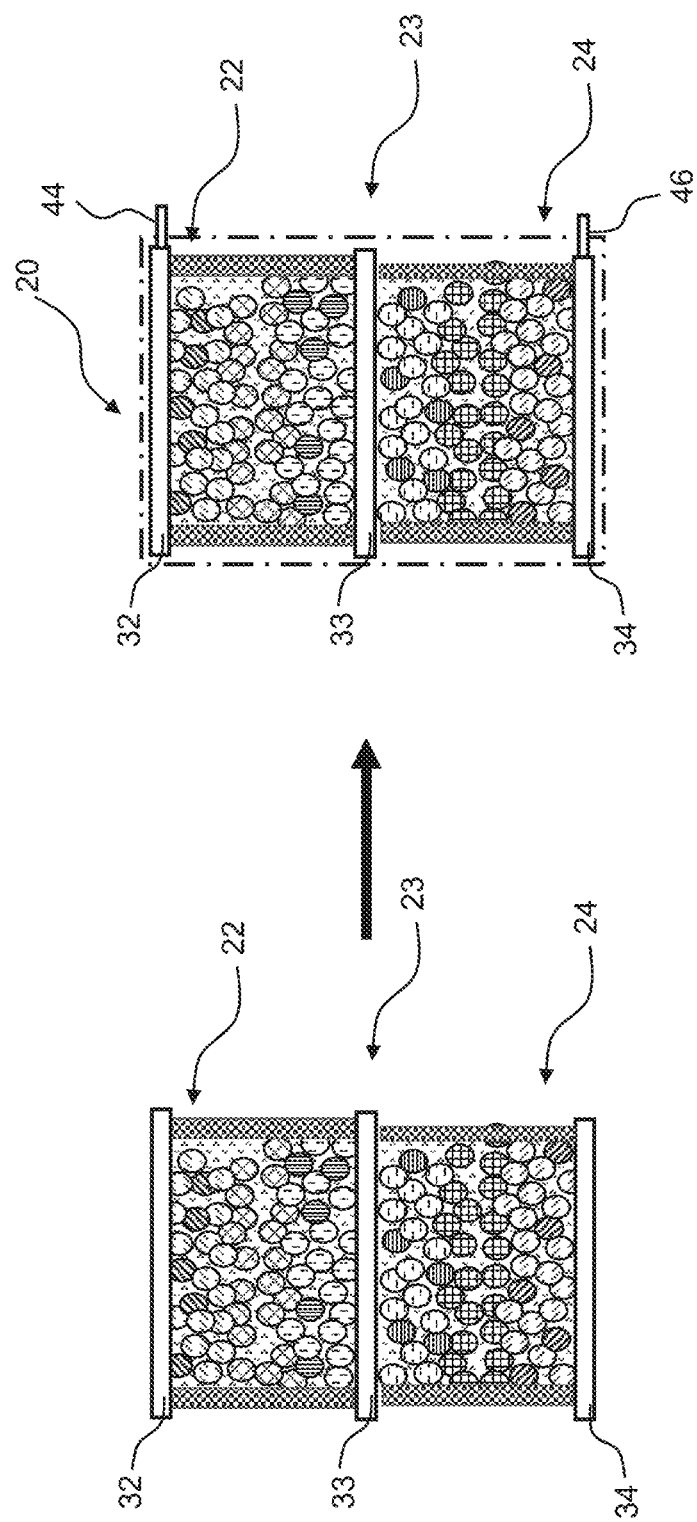
FIG. 6 is an illustration of an example of one or more steps in a method for forming a solid-state battery in accordance with various aspects of the current technology.

Additionally, referring to FIG. 6 in some aspects, the electrodes may be subjected to additional processing to progress the electrodes toward an intermediate product or the end-product, for example, the battery 20 discussed with respect to FIG. 1. For example, in some aspects one or more tabs may be attached to one or more of the electrodes. For example, a negative tab 44 may be attached (e.g., welded) to the negative current collector 32 and a positive tab 46 may be attached (e.g., welded) to the positive current collector 34. Also, in some aspects, the cells may be sealed, such as by placement within an aluminum-laminated bag or container and/or by vacuum-sealing.

In some aspects, the method discussed with respect to FIGS. 2-5 may yield a battery exhibiting good contact between the various pluralities of solid-state electroactive particles and the pluralities of solid-state electrolyte particles. For example, such as illustrated in FIG. 1, the method yields a gel 80, formed in situ, that may be disposed within the battery 20 so as to fill void spaces and wet interfaces between the solid-state electrolyte particles and/or the solid-state active material particles which may, for example only, reduce interparticle porosity and improve ionic contact between cell components and/or enable higher thermal stability.

Figure 7:
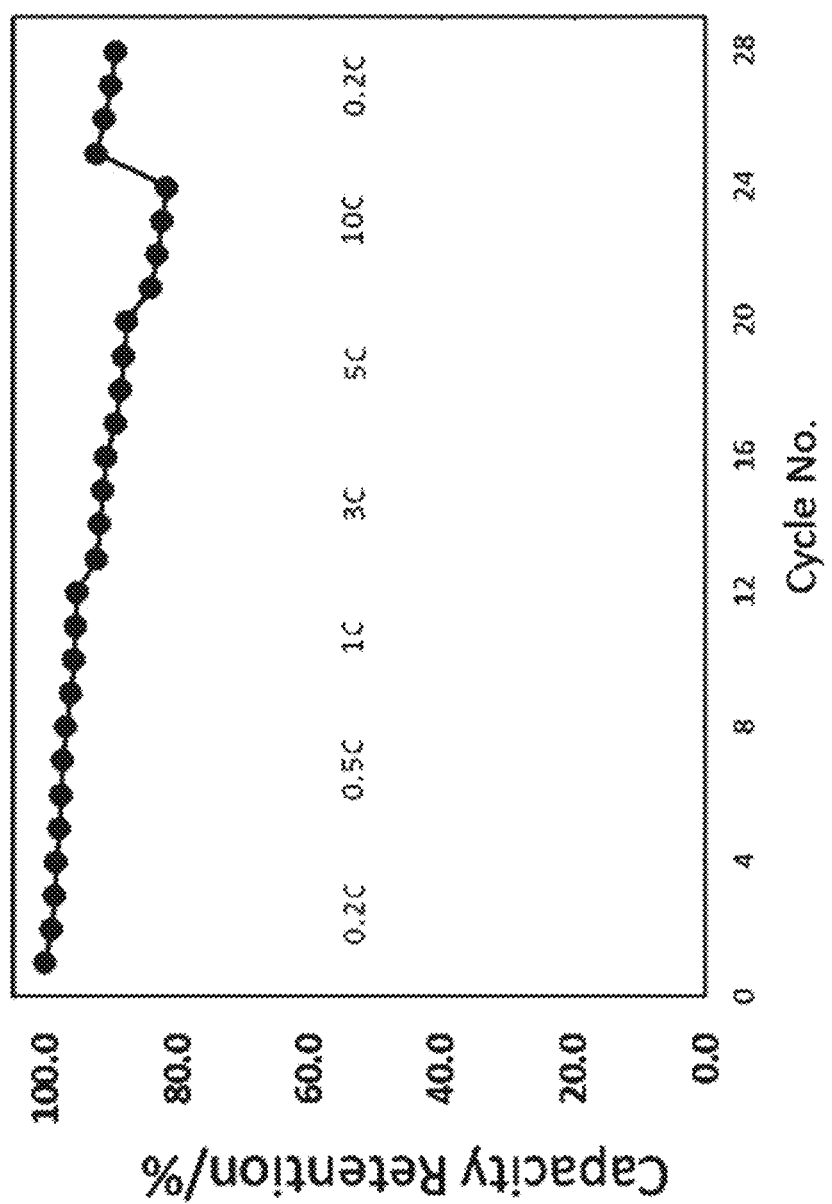
FIG. 7 is a graphical illustration of electrochemical data for a solid-state battery formed in accordance with various aspects of the current technology.

A battery, such the battery 20 discussed with respect to FIGS. 1-6, may also exhibit excellent performance characteristics. Referring to FIG. 7, electrochemical data demonstrated that a battery formed according to the process discussed with respect to FIGS. 2-5 can endow the cell with an excellent rate capability. As shown in FIG. 7, at 10 C rate, the cell can exhibit 82% capacity retention at 25° C., indicating the viability of the processed discussed herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a bipolar solid-state battery, the method comprising:
   preparing a mixture of gel precursor solution and solid electrolyte, wherein the gel precursor comprises a polymer, a first solvent, and a liquid electrolyte, wherein the liquid electrolyte comprises a second solvent, a lithium salt and an electrolyte additive;
   loading the mixture of the gel precursor solution and the solid electrolyte onto at least one of a first electrode, a second electrode, and a third electrode, wherein each of the first electrode, the second electrode, and the third electrode comprises a plurality of solid-state electroactive particles;

removing at least a portion of the first solvent from the mixture of gel precursor and solid electrolyte to form a gel; and positioning one of the first electrode, the second electrode, and the third electrode with respect to another of the first electrode, the second electrode, and the third electrode, wherein the first electrode comprises a negative electrode, the second electrode comprises a bipolar electrode having a first side and a second side, and the third electrode comprises a positive electrode.

2. The method of claim 1, wherein the polymer comprises a poly(ethylene oxide), a poly(vinylidene fluoride-co-hexafluoropropylene), a poly(methyl methacrylate), a carboxymethyl cellulose, a polyacrylonitrile, a polyvinylidene difluoride, a poly(vinyl alcohol), a polyvinylpyrrolidone, or combinations thereof.

3. The method of claim 1, wherein the first solvent comprises dimethyl carbonate, ethylmethyl carbonate, propylene carbonate, ethylene carbonate, diethyl carbonate, methyl propyl carbonate, tetrahydrofuran, ethyl acetate, dimethyl sulfoxide, acetonitrile, N-methyl-2-pyrrolidone, dimethoxyethane, dioxolane, y-butyrolactone, acetone, N,N-dimethylformamide, alcohols such as isopropyl alcohol and butanol.

4. The method of claim 1, wherein the second solvent comprises at least one of ethylene carbonate, propylene carbonate, glycerol carbonate, vinylene carbonate, fluoroethylene carbonate, 1,2-butylene carbonate, γ-butyrolactone or δ-valerolactone, succinonitrile, glutaronitrile, adiponitrile; tetramethylene sulfone, ethyl methyl sulfone, vinyl sulfone, phenyl sulfone, 4-fluorophenyl sulfone, benzyl sulfone, triethylene glycol dimethylether, tetraethylene glycol dimethylether, 1,3-dimethoxy propane, 1,4-dioxane, triethyl phosphate, trimethyl phosphate, or an ionic liquid including an ionic cation and an ionic anion.

5. The method of claim 1, wherein the lithium salt comprises an anion selected hexafluoroarsenate, hexafluorophosphate, bis(fluorosulfonyl)imide, perchlorate, tetrafluoroborate, cyclo-difluoromethane-1,1-bis(sulfonyl) imide, bis(trifluoromethanesulfonyl)imide, bis (perfluoroethanesulfonyl)imide, bis(oxalate)borate, difluoro (oxalato)borate, and bis(fluoromalonato)borate.

6. The method of claim 1, wherein the solid electrolyte comprises an oxide-based particle, a metal-doped or aliovalent-substituted oxide particle, a sulfide-based particle, a nitride-based particle, a hydride-based particle, a halide-based particle, a borate-based particle, an inactive oxide, or combinations thereof.

7. The method of claim 1, wherein the first electrolyte comprises a negative electrode having a first plurality of negative solid-state electroactive particles.

8. The method of claim 1, wherein the second electrolyte comprises a bipolar electrode having a first side and a second side, the first side having a first plurality of positive solid-state electroactive particles, and the second side having a second plurality of negative solid-state electroactive particles.

9. The method of claim 1, wherein the third electrolyte comprises a positive electrode having a second plurality of positive solid-state electroactive particles.

10. The method of claim 1, wherein the mixture of the gel precursor solution and the solid electrolyte is applied to each of the negative electrode, the first side of the bipolar electrode, the second side of the bipolar electrode, and the positive electrode.

11. The method of claim 1, wherein the mixture of the gel precursor solution and the solid electrolyte is applied to one of the negative electrode and the first side of the bipolar electrode and one of the second side of the bipolar electrode and the positive electrode.

12. The method of claim 1, wherein the removing at least a portion of the first solvent from the mixture of gel precursor and solid electrolyte comprises evaporating the first solvent.

13. The method of claim 1, wherein the negative electrode is positioned adjacent to the first side of the bipolar electrode and the positive electrode is positioned adjacent to the second side of the bipolar electrode.

14. The method of claim 13, further comprising pressing the negative electrode, the bipolar electrode, and the positive electrode together.

15. The method of claim 1, further comprising applying a polymer blocker to one or more of borders of the first electrode, the second electrode, or the third electrode.

16. A method for forming a bipolar solid-state battery, the method comprising:

preparing a mixture of gel precursor solution and solid electrolyte, wherein the gel precursor comprises a polymer, a first solvent, and a liquid electrolyte, wherein the liquid electrolyte comprises a second solvent, a lithium salt and an electrolyte additive;

loading the mixture of the gel precursor solution and the solid electrolyte onto at least one of a first electrode, a second electrode, and a third electrode, wherein each of the first electrode, the second electrode, and the third electrode comprises a plurality of solid-state electroactive particles;

removing at least a portion of the first solvent from the mixture of gel precursor and solid electrolyte to form a gel;

applying a polymer blocker to one or more of borders of a first electrode, a second electrode, and a third electrode;

positioning one of the first electrode, the second electrode, and the third electrode with respect to another of the first electrode, the second electrode, and the third electrode; and solidifying the polymer blocker, wherein the first electrode comprises a negative electrode, the second electrode comprises a bipolar electrode having a first side and a second side, and the third electrode comprises a positive electrode.

17. The method of claim 16, wherein the polymer blocker is applied to the borders of two of the first electrode, the second electrode, and the third electrode.

18. The method of claim 16, wherein the polymer blocker is applied to a border of the first electrode, the second electrode, or the third electrode.

19. The method of claim 16, wherein the polymer blocker comprises a hot-melt adhesive, a polyethylene resin, a polypropylene resin, a resin containing an amorphous polypropylene resin as a main component and obtained by copolymerization with ethylene, propylene, and butylene, a silicone, a polyimide resin, an epoxy resin, an acrylic resin, a rubber, an isocyanate adhesive, an acrylic resin adhesive, a cyanoacrylate adhesive, or combinations thereof.

* * * * *